United States Patent
Hago et al.

(10) Patent No.: US 8,557,449 B2
(45) Date of Patent: Oct. 15, 2013

(54) CATHODE FOR METAL-AIR RECHARGEABLE BATTERY

(76) Inventors: Wilson Hago, Camarillo, CA (US); Ivan Marc Lorkovic, Santa Barbara, CA (US)

(*) Notice: Subject to any disclaimer, the term of this patent is extended or adjusted under 35 U.S.C. 154(b) by 263 days.

(21) Appl. No.: 13/167,732

(22) Filed: Jun. 24, 2011

(65) Prior Publication Data

US 2011/0318656 A1 Dec. 29, 2011

Related U.S. Application Data

(60) Provisional application No. 61/358,326, filed on Jun. 24, 2010.

(51) Int. Cl.
| | |
|---|---|
| H01M 12/06 | (2006.01) |
| H01M 4/36 | (2006.01) |
| H01M 4/42 | (2006.01) |
| C01B 35/12 | (2006.01) |
| C01B 35/14 | (2006.01) |
| C01B 25/26 | (2006.01) |
| C01G 51/04 | (2006.01) |
| B01J 27/20 | (2006.01) |
| B01J 27/19 | (2006.01) |
| B01J 27/188 | (2006.01) |
| B01J 27/185 | (2006.01) |

(52) U.S. Cl.
USPC .......... 429/405; 429/406; 423/277; 423/279; 423/311; 423/594.5; 502/174; 502/210; 502/211; 502/213

(58) Field of Classification Search
USPC ............... 429/400, 402, 403, 404, 405, 406; 423/277, 279, 311, 594.5; 502/174, 502/210, 211, 213
See application file for complete search history.

(56) References Cited

U.S. PATENT DOCUMENTS 6,653,005 B1 * 11/2003 Muradov .................. 429/410

FOREIGN PATENT DOCUMENTS

GB 2059141 A * 4/1981

OTHER PUBLICATIONS

"Highly Active Nonplatinum Catalyst for Air Cathodes", Sawai et al., Journal of the Electrochemical Society, 151 (12) A2132-A2137. 2004.*
"Non-Platinum Air Cathode Catalyst for Metal/Air Batteries", Sawai et al., 210th ECS Meeting, Cancun, Mexico, Nov. 2006.*
"Lithium-Air Cells with High Capacity Cathodes", Dobley et al., 210th ECS Meeting, Cancun, Mexico, Nov. 2006.*
"Iron phthalocyanine as a cathode catalyst for a direct borohydride fuel cell", Ma et al., Journal of Power Sources 172, P220-224, Jul. 24, 2007.*

* cited by examiner

*Primary Examiner* — Kenneth Douyette

(57) ABSTRACT

An air cathode for a metal-air battery is disclosed which contains a catalyst chosen to make the metal air battery more easily rechargeable. This catalyst is based on cobalt phosphate, cobalt borate mixed metal cobalt phosphates, mixed metal cobalt borates, or mixed metal cobalt phosphate borates.

11 Claims, No Drawings

CATHODE FOR METAL-AIR RECHARGEABLE BATTERY

RELATED APPLICATION

This application claims the benefit of Provisional Application 61/358,326, filed on Jun. 24, 2010.

TECHNICAL FIELD

The present invention relates generally to a rechargeable lithium-air battery, in particular, a battery containing an air cathode for rechargeable lithium-air battery.

DESCRIPTION OF THE RELATED ART

A Li—$O_2$ battery with an aqueous has a theoretical gravimetric density of 1300 Wh/kg cell weight, while one with a non-aqueous electrolyte has been estimated at around 5200 Wh/kg. This technology has the potential to supplant present Li-ion technology (typically 200 Wh/kg) which is widely used in cell phones, a host of other electronic equipment, and some proposed automobiles. The idealized reactions for a battery that uses a cathode with an aqueous electrolyte are:

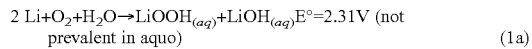  (1a)

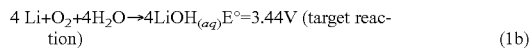  (1b)

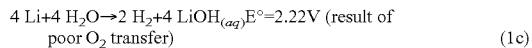  (1c)

The idealized reactions for a battery that uses a cathode with a nonaqueous electrolyte are:

  (2a)

  (2b)

The cathode half-cell reaction is:

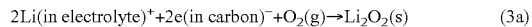  (3a)

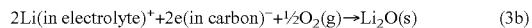  (3b)

The aqueous cathodes have more flexibility than non-aqueous cathodes owing to the increased solubility of the highly ionic products. Aqueous media also facilitate full 4 e⁻ reduction of $O_2$ to 4 OH⁻ which improves energy density. Furthermore, a Li cell with an aqueous air cathode may also utilize water as oxidant, generating $H_2$ in the process which could in principle be reused downstream.

Despite extensive work on this battery-system, a commerciable viable battery is not available for several reasons. A lithium-air battery with an aqueous cathode cannot safely operate without a lithium conducting water barrier that also protects the anode from water corrosion and self discharge. The most widely used barrier membrane is LISICON®(for lithium superionic conductor). U.S. Patent Application 20100104934 by Visco et al. discusses a lithium-air cell built using LISICON/LiPON (lithium phosphorus oxynitride) as membrane and an air cathode obtained from an air cathode used in Zn-air cells. This cell was cycled at an estimated rate of 2C and an estimated gravimetric density of 70 Wh/kg cell weight. The latter number is far below the theoretical gravimetric energy density. Part of the reason for the undeveloped potential of Li-air cells lays with the lack of a suitable catalyst for effecting the oxygen reduction.

Imanishi et al.(See *Journal of The Electrochemical Society*, 157(2) A214-A218 (2010).) used Pt in an electrocatalyst for the air side for a Li-air cell. These researchers succeeded in generating a rechargeable Li/air cell using acetic acid/acetate as buffer/electrolyte on the aqueous cathode interfacing the LISICON/nonaqueous electrolyte/Li electrode. From a practical and commercially minded point of view, though, the use of Pt and high temperatures are to be avoided due to high expense.

The oxygen reduction reaction typically occurs on a carbon surface and a catalyst is often used to accelerate the reaction kinetics and enable rechargeability. In nonaqueous systems, capacity fade upon cycling is believed to arise from a degradation of the cathode, based on impedance data and reference electrode data. In aqueous systems, it is likely that both cathode and anode degradation contribute to poor rechargeability and low specific energy. The performance of lithium oxygen batteries involves the interface of three phases: liquid electrolyte, solid cathode surface and oxygen gas. The following interfaces are thus involved during cycling:

Cathode-oxygen (e.g. cathode active sites, total cathode surface area, and potential needed for $O_2$ reduction)
Electrolyte-gas (e.g. oxygen diffusion in electrolyte)
Electrolyte-solid (e.g. electrolyte wetting)
LISICON/electrolyte (issue of compatibility)

The oxygen-cathode interface is thought to be responsible for the rechargeability, or lack thereof, of lithium-air batteries. Two factors play a crucial role: cathode catalyst composition and cathode porosity. The present invention relates to cathode catalyst composition.

The reduction of oxygen is not a facile process. There is typically significant overpotential associated with the reaction, which can be lessened with redox-active and/or transition metal catalysts. Abraham and Jiang (*Journal of the Electrochemical Society* 143(1), 1 (1996)) were the first to show reversibility for a lithium-oxygen cell utilizing a nonaqueous cathode. Their cathode utilized 95% Chevron acetylene black and 5% of cobalt oxide catalyst, obtained from the decomposition of cobalt pthalocyanine. This cell performed for 3 to 4 cycles with an end discharge capacity of 1600 mA/g in air.

Debart et al. (*Journal of Power Sources* 174, 1177 (2007)) demonstrated an air cathode for this system that utilized 95% Super S carbon, 2.5% catalyst and 2.5% PVDF binder. Electrolytic manganese dioxide (EMD) as catalyst was reported to yield a capacity of 600 mAh/g at 50 cycles. A separate experiment utilizing micron-sized cobalt oxide as catalyst yielded a capacity of 1300 mAh/g at 10 cycles. While the charge voltage plateau is 4.3V with the use of EMD, down from 4.8V without catalyst, it was reported that cobalt oxide reduced the charging plateau to 4.0V. Of the common phases of $MnO_2$, γ-$MnO_2$ has been claimed to be superior in rechargeability. It has been posited that γ-$MnO_2$ facilitates charging by providing a surface for oxygen desorption. $MnO_2$ has been the most mentioned catalyst for charging lithium-oxygen cells in both aqueous and nonaqueous systems. For deep discharges, capacity fade with this catalyst typically follows a linear decay with each cycle. In some cases of the prior art, decay does not start until after the 10$^{th}$ cycle. U.S. Pat. No. 7,011,09 due to Atwater et al. describes a manganese, bismuth mixed metal oxide cathode $MnO_2(Bi_2O_3)$ catalyst for rechargeable lithium electrochemical systems. When placed into a cathode in an electrochemical cell with lithium metal anode, the use of this catalyst led to improved cycle life and increased power and energy. Lu et al. (*Electrochemical and Solid State Letters* 13(6), A69 (2010)) showed remarkable improvement in lowering the charging voltage using gold particles as a catalyst in a lithium-oxygen cell. Platinum particles were said to improve the discharge performance, but at 40% per weight of carbon, a rather high amount for a potentially commercial product. Less expensive and more effective catalysts are needed to improve the rechargeability of lithium-air cells.

DETAILED DESCRIPTION OF THE INVENTION

The kinetics of oxygen reduction has been widely studied for aqueous systems, in particular with oxygen production during water splitting, either during electrolysis or photosynthetic-like processes. US Patent Application 20100133111 describes catalysts capable of oxidizing water with high efficiency and low overpotential to oxygen at neutral pH. These catalysts have been used in the photoelectrolysis of water, particularly in photoanodes. Surprisingly, it has been found that photocatalysts can also serve as suitable catalysts for air reduction in metal air batteries. The reverse reaction of water splitting, oxygen reduction, is facilitated by the novel electrocatalysts. The present invention discloses these novel catalysts for the air reduction step in a metal-air battery.

The present invention focuses on the improvement of the cathode-oxygen interface, in particular on improving the performance of the air cathode in metal air batteries via the use of novel catalysts. The present invention exploits recent discoveries in the field of water oxidation photoelectrocatalysis based upon electrodeposited late transition metal phosphate ($P_i$) or borate ($B_i$) salts. We have found that the effective photocatalysts for the oxidation of water are also good electrocatalysts for oxygen reduction in metal-air batteries. In the photoelectrolysis studies, the best performing and most rugged materials have been films of $Co_3O_4/PO_4$ electrodeposited from $Co^{II}$ phosphate and borate solutions onto electrodes stable to oxidation. The main challenge in incorporating these materials into effective Li-air cells is that upon reduction to $Co^{II}$ from the active oxidation catalyst $Co^{II/III}$ film, solubility issues arise. However, upon reoxidation the Co is reprecipitated with little loss of catalytic activity. In the present invention, these materials catalyze the charge reaction (evolution of $O_2$).

Without being bound by theory, it is believed that cobalt phosphate and cobalt borate have been found to be effective oxygen catalysts because of the potential formation of lithium phosphate and lithium borate as intermediates during charging. In particular, lithium phosphate is a stable, excellent lithium conductor because of its ability to exchange lithium ions with the electrolyte. This in turn should help enhance the rate of discharge since the lithium ions are more evenly distributed prior to the formation of $Li_2O_2$. Additionally, during charge $Li_2O_2$ mixed with doped lithium phosphate is more conductive than $Li_2O_2$ by itself Lithium phosphate may be used in conjuction with these catalysts by separate addition. It is expected that additional doping with transition metals would enhance electronic conduction.

The fact that borates and phosphates are so far the most active and self-healing electrolytes for this system is highly compatible with the requirement that the aqueous electrolyte of a Li/air cell have buffer capacity to preserve a LISICON separator (if used), and furthermore, because the membrane itself contains phosphate and borate equivalents, it is stabilized by the common ion effect. Additionally, borate and phosphate based electrolytes can be buffered below pH=7 so that atmospheric $CO_2$ has little effect on the performance of the electrolyte.

Cobalt phosphate and cobalt borate are the two best modes of the present invention. The electrocatalysts may be used in metal-air batteries containing aqueous or non-aqueous electrolytes. The concentrations of catalyst may range preferably from 0.1% to 20%, and more preferably from 0.5% to 10%, and most preferably from 1% to 5% by weight of the catalyst.

Cobalt phosphate borate is another embodiment of the present invention. Additional embodiments include mixed metal cobalt phosphates and borates, as well as mixed metal cobalt phosphate borate. Any metal chosen from elements capable of forming alloys with cobalt may be used, including Ni, Cu, Zn, Cr, W, Mo, Fe, Mn, Si, C. These compounds may be a metal salt of formula $M_xCo_{3-x}PO_4$ where M is a metal or metals that can form alloys with Co, selected from Ni, Cu, Zn, Cr, W, Mo, Fe, Mn, Si, C, and x is a number from 0 to 3, or a metal salt of formula $M_yCo_{2-y}B_2O_4$, where M is a metal or metals that can form alloys with Co, selected from Ni, Cu, Zn, Cr, W, Mo, Fe, Mn, Si, C, and y is a number from 0 to 2, or a metal salt of formula $M_zCo_{3-z}BPO_7$ where M is a metal or metals that can form alloys with Co, selected from Ni,Cu, Zn, Cr, W, Mo, Fe, Mn, Si, C and z is a number from 0 to 3.

The electrocatalysts of the present invention may be incorporated in a buffer system. In fuel cells, for example, it has been demonstrated that the oxygen overpotential is reduced to 200 mV at a rate of 10 mA/cm$^2$ when an 85% $H_3PO_4$ is added to the cathode at relatively high temperatures (over 100° C.). It has been found that a $Co_3PO_4/H_3PO_4$ buffer system improves cathode performance for an aqueous based lithium-air cell.

The catalysts of the present invention may be incorporated in any metal-air electrochemical system, including cathodes used in zinc-air, lithium-air, aluminum-air batteries. In particular, the present invention may be incorporated in lithium-air or lithium-oxygen batteries containing either aqueous or nonaqueous electrolytes. When incorporated in cathodes, the catalysts maybe mixed with compatible electronic conductors such as nickel foam and binders such as PVDF. The cathode containing the catalysts of the present invention may be used in metal-air batteries along with suitable separators, electrolytes and suitably protected anode.

The invention claimed is:

1. A catalyst for an air cathode of an electrochemical system, comprising at least one of the following:
    cobalt phosphate,
    cobalt borate,
    cobalt borate phosphate,
    a metal salt of formula $M_xCo_{3-x}PO_4$ where M is a metal or metals that can form alloys with Co, selected from Ni, Cu, Zn, Cr, W, Mo, Fe, Mn, Si, C, and x is a number from 0 to 3,
    a metal salt of $M_yCo_{2-y}B_2O_4$, where M is a metal or metals that can form alloys with Co,
    selected from Ni, Cu, Zn, Cr, W, Mo, Fe, Mn, Si, C, and y is a number from 0 to 2,
    a metal salt of formula $M_zCo_{3-z}BPO_7$ where M is a metal or metals that can form alloys with Co, selected from Ni,Cu, Zn, Cr, W, Mo, Fe, Mn, Si, C and z is a number from 0 to 3.

2. A catalyst according to claim 1 in which the catalyst comprises from 0.01% to 20% by weight of the air cathode.

3. A catalyst according to claim 1 in which lithium phosphate is used jointly with the catalyst.

4. An air cathode for an electrochemical system, comprising:
    a) An electronic conductor
    b) a binder
    c) a catalyst,
        wherein the catalyst is chosen from one at least one of the following:
        cobalt phosphate,
        cobalt borate,
        cobalt borate phosphate, a metal salt of formula $M_xCo_{3-x}PO_4$ where M is a metal or metals that can form alloys with Co, selected from Ni, Cu, Zn, Cr, W, Mo, Fe, Mn, Si, C, and x is a number from 0 to 3, a metal salt of $M_yCo_{2-y}B_2O_4$, where M is a metal or metals that can form alloys with Co, selected from Ni, Cu, Zn, Cr, W, Mo, Fe, Mn, Si, C, and y is a number from 0 to 2, a metal salt of formula $M_zCo_{3-z}BPO_7$ where M is a metal or metals that can form alloys with Co, selected from Ni,Cu, Zn, Cr, W, Mo, Fe, Mn, Si, C and z is a number from 0 to 3.

5. An air cathode according to claim 4 in which the catalyst comprises from 0.01% to 20% by weight of the entire cathode.

6. An air cathode according to claim 4 in which lithium phosphate is used jointly with the catalyst.

7. An open electrochemical cell, comprising:
a) a cathode, comprising: i) an electronic conductor ii) gas permeable binder and iii) a catalyst,
wherein the catalyst is chosen from one at least one of the following:
cobalt phosphate,
cobalt borate,
cobalt borate phosphate,
a metal salt of formula $M_xCo_{3-x}PO_4$ where M is a metal or metals that can form alloys with Co, selected from Ni, Cu, Zn, Cr, W, Mo, Fe, Mn, Si, C, and x is a number from 0 to 3,
a metal salt of $M_yCo_{2-y}B_2O_4$, where M is a metal or metals that can form alloys with Co,
selected from Ni, Cu, Zn, Cr, W, Mo, Fe, Mn, Si, C, and y is a number from 0 to 2,
a metal salt of formula $M_zCo_{3-z}BPO_7$ where M is a metal or metals that can form alloys with Co, selected from Ni,Cu, Zn, Cr, W, Mo, Fe, Mn, Si, C and z is a number from 0 to 3.
b) an electrolyte;
c) a separator and
d) an anode.

8. An electrochemical system according to claim 7 in which the anode is chosen from: zinc metal, lithium metal, aluminum metal.

9. An electrochemical system according to claim 7 in which the electrolyte is aqueous-based.

10. An electrochemical system according to claim 9 in which the electrolyte contains phosphoric acid.

11. An electrochemical system according to claim 7 in which the electrolyte is non-aqueous.

* * * * *